US010635618B2

(12) United States Patent
Luo et al.

(10) Patent No.: US 10,635,618 B2
(45) Date of Patent: Apr. 28, 2020

(54) MODIFYING A CONFIGURATION OF A PORT HUB

(71) Applicant: 2236008 Ontario Inc., Waterloo (CA)

(72) Inventors: Yuchen Luo, Ottawa (CA); Gervais Kafwe Mulongoy, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 16/132,532

(22) Filed: Sep. 17, 2018

(65) Prior Publication Data

US 2020/0089636 A1    Mar. 19, 2020

(51) Int. Cl.
*G06F 13/38*   (2006.01)
*G06F 13/364*   (2006.01)
*G06F 11/30*   (2006.01)
*G06F 1/26*   (2006.01)
*G06F 13/42*   (2006.01)

(52) U.S. Cl.
CPC ............ *G06F 13/385* (2013.01); *G06F 1/266* (2013.01); *G06F 11/3055* (2013.01); *G06F 13/364* (2013.01); *G06F 13/4282* (2013.01); *G06F 2213/3812* (2013.01)

(58) Field of Classification Search
None
See application file for complete search history.

(56) References Cited

U.S. PATENT DOCUMENTS

| | | | | |
|---|---|---|---|---|
| 8,909,842 | B2* | 12/2014 | Johnson | G06F 13/4022 710/305 |
| 9,460,037 | B2* | 10/2016 | Voto | G06F 13/4282 |
| 9,647,877 | B2* | 5/2017 | Tahara | H04L 41/04 |
| 10,289,589 | B2* | 5/2019 | Chhor | G06F 13/4022 |
| 2008/0005262 | A1 | 1/2008 | Wurzburg et al. | |
| 2008/0005415 | A1* | 1/2008 | Lopez | G06F 13/385 710/62 |
| 2010/0205463 | A1 | 8/2010 | Magnusson | |
| 2014/0064056 | A1* | 3/2014 | Sakata | H04L 41/00 370/216 |
| 2015/0365237 | A1* | 12/2015 | Soffer | G06F 21/85 726/20 |
| 2017/0046289 | A1* | 2/2017 | Hundal | G06F 13/385 |
| 2018/0052799 | A1* | 2/2018 | Shetty | G06F 13/4282 |
| 2018/0067875 | A1 | 3/2018 | Ghosh et al. | |
| 2018/0232323 | A1 | 8/2018 | Ghosh et al. | |
| 2019/0065422 | A1* | 2/2019 | Sporck | G06F 13/385 |

OTHER PUBLICATIONS

R. Enns et al., Internet Engineering Task Force (IETF), Request for Comments: 6241, Obsoletes: 4741, Category: Standards Track, ISSN: 2070-1721, Network Configuration Protocol (NETCONF), Jun. 2011 (113 pages).
M. Bjorklund, Internet Engineering Task Force (IETF), Request for Comments: 7950 ,Category: Standards Track, ISSN: 2070-1721, The Yang 1.1 Data Modeling Language, Aug. 2016 (217 pages).

(Continued)

*Primary Examiner* — Elias Mamo
(74) *Attorney, Agent, or Firm* — Trop, Pruner & Hu, P.C.

(57) ABSTRACT

In some examples, an electronic device includes a hub configurator to obtain, from a port hub that expands a number of ports for the electronic device, information of topological elements of the port hub, and modify a configuration of the port hub.

22 Claims, 4 Drawing Sheets

(56) References Cited

OTHER PUBLICATIONS

M. Bjorklund et al., Internet Engineering Task Force (IETF), Request for Comments: 8340, BCP: 215, Category: Best Current Practice, ISSN: 2070-1721, Yang Tree Diagrams, Mar. 2018 (13 pages).
Wikipedia, USB last edited on Jul. 14, 2018 (15 pages).
Wikipedia, Yang last edited on Jul. 7, 2018 (4 pages).
Hewlett-Packard Company et al., Universal Serial Bus 3.0 Specification, Revision 1.0, Nov. 12, 2008 (482 pages)—1 of 5 (100 pages).
Hewlett-Packard Company et al., Universal Serial Bus 3.0 Specification, Revision 1.0, Nov. 12, 2008 (482 pages)—2 of 5 (100 pages).
Hewlett-Packard Company et al., Universal Serial Bus 3.0 Specification, Revision 1.0, Nov. 12, 2008 (482 pages)—3 of 5 (100 pages).
Hewlett-Packard Company et al., Universal Serial Bus 3.0 Specification, Revision 1.0, Nov. 12, 2008 (482 pages) 4 of 5 (100 pages).
Hewlett-Packard Company et al., Universal Serial Bus 3.0 Specification, Revision 1.0, Nov. 12, 2008 (482 pages) 5 of 5 (82 pages).
Canadian Intellectual Property Office, International Search Report and Written Opinion for PCT/CA2019/050979 dated Sep. 19, 2019 (8 pages).

\* cited by examiner

MODIFYING A CONFIGURATION OF A PORT HUB

BACKGROUND

Electronic device includes various types of ports that can connect to other devices. An example type of port is a Universal Serial Bus (USB) port. Peripheral devices such as a storage card, a display device, a camera, a smartphone, or any other type of device can connect to the USB port.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A Universal Serial Bus (USB) hub is a device that expands a USB port of a host device into multiple USB ports so that more devices can connect to the host device. Examples of host devices include any or some combination of the following: desktop computers, notebook computers, tablet computers, smartphones, vehicle computers, or other types of electronic devices.

As used here, a "host device" can refer to an electronic device that is capable of acting as a bus master on a bus (e.g., a USB bus) to initiate communications on the bus with one or more slave devices. In the context of USB, the host device on a USB bus operates in a host mode, and a slave device on the USB bus operates in a device mode.

Although reference is made to USB in examples described in the present disclosure, it is noted that techniques or mechanisms according to some examples can be applied in the context of other protocols that govern communications between devices.

Traditionally, a USB hub (or more generally, a port hub that expands a number of ports for an electronic device) is statically configured. The USB hub can include functionalities defined by a USB Specification (e.g., the USB 3.0 Specification, the USB 3.1 Specification, etc.). In some cases, the USB hub can include additional features that are outside the scope of the USB Specification.

A USB hub being statically configured refers to the USB hub having a topology with a static configuration that cannot be changed dynamically by an electronic device. While ports of a USB hub can be enabled and disabled, the way the ports are connected and additional features of the ports cannot be dynamically modified. Accordingly, once the USB hub is deployed, the configuration of the topology of the USB hub cannot be dynamically changed to re-wire or re-connect the ports or to dynamically enable or disable or dynamically change various features of the ports.

Although reference is made to devices that operate according to USB in examples described herein, it is noted that techniques or mechanisms according to some implementations can be applied to operations according to other communication protocols in other examples.

Figure 1:
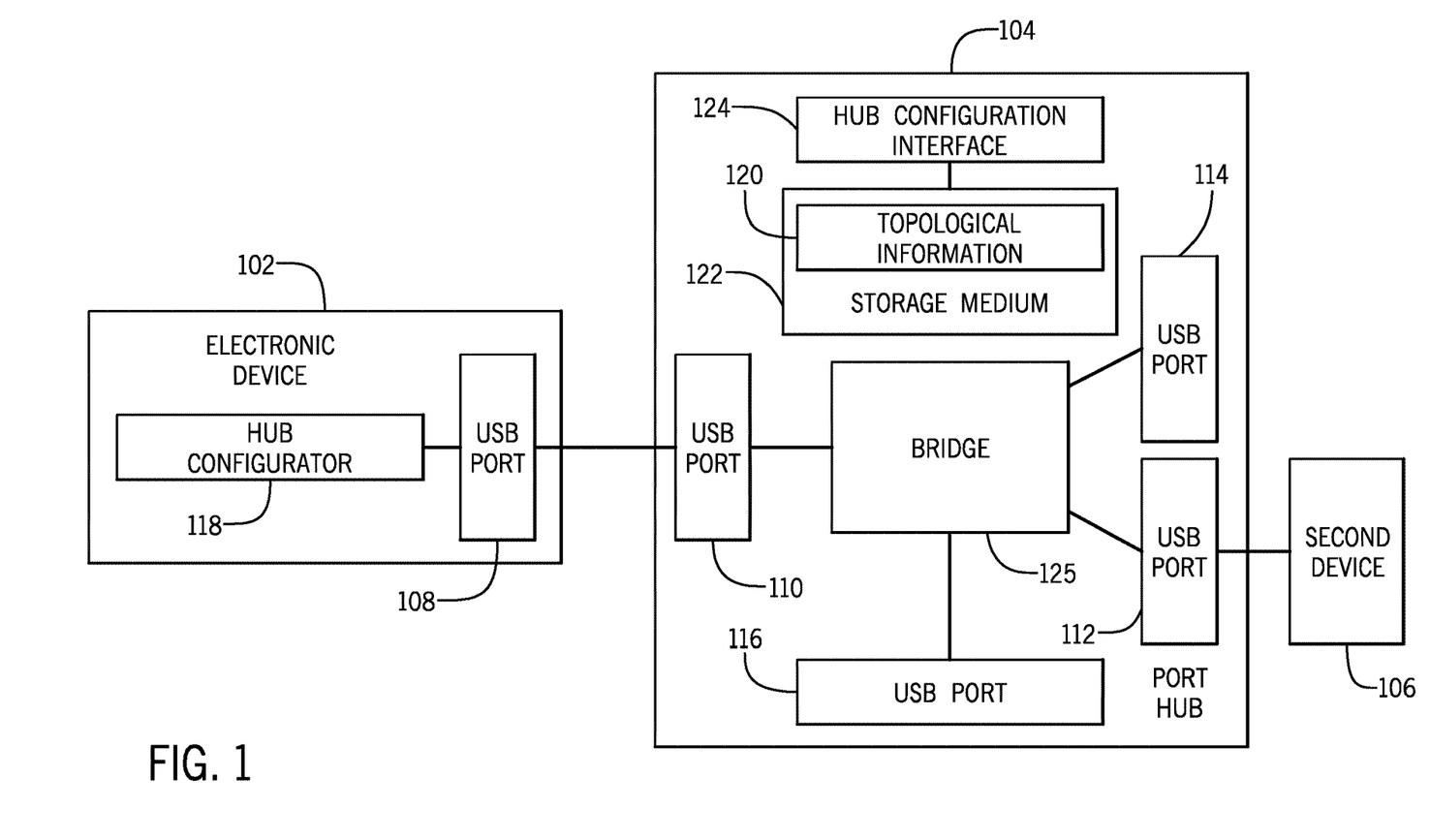
FIG. 1 is a block diagram of an example arrangement that includes devices connected to a port hub, according to some implementations of the present disclosure.

FIG. 1 is a block diagram of an example arrangement that includes an electronic device 102, a port hub 104 (e.g., a USB hub), and a second device 106. Examples of the electronic device 102 can include any or some combination of the following: a desktop computer, a notebook computer, a tablet computer, a smartphone, a game appliance, a vehicle computer, or any other type of electronic device. The second device 106 can also be one of the foregoing types of electronic devices, or a different type of device.

The electronic device 102 has a USB port 108 that is connected to a corresponding USB port 110 of the port hub 104, which expands a number of ports for the electronic device 102. The second device 106 also includes a USB port (not shown) that is connected to a corresponding USB port 112 of the port hub 104. The port hub 104 includes additional USB ports 114 and 116, which can be connected to other devices (not shown). Although FIG. 1 shows an example in which the port hub has a specific number of USB ports, it is noted that in other examples, the port hub 104 can include a different number of USB ports.

Moreover, although FIG. 1 shows just two devices 102 and 106 connected to one port hub 104, it is noted that more than two devices can be connected to the port hub 104 or more than one port hub in other examples.

The electronic device 102 includes a hub configurator 118 that is able to perform tasks according to some implementations of the present disclosure. In some examples, the hub configurator 118 is implemented as a hardware processing circuit.

A hardware processing circuit can include any or some combination of a microprocessor, a core of a multi-core microprocessor, a microcontroller, a programmable integrated circuit, a programmable gate array, or another hardware processing circuit. Alternatively, the hub configurator 118 can be implemented as a combination of a hardware processing circuit and machine-readable instructions (software and/or firmware) executable on the hardware processing circuit.

In some implementations, the hub configurator 118 is able to obtain, from the port hub 104, information of topological elements of the port hub 104. Such information is stored as topological information 120 in a storage medium 122 of the port hub 104. The storage medium 122 can be implemented using one or more storage devices, such as a memory device or a persistent storage device. Although FIG. 1 shows the storage medium 122 as being part of the pot hub 104, in other examples, the storage medium 122 storing the topological information 120 can be external of the port hub 104, but accessible by the port hub 104.

The topological elements for which the topological information 120 contains information can represent the port hub 104 itself and the USB ports 110, 112, 114, and 116 of the port hub 104. In further examples, the topological elements of the port hub 104 can further represent a bridge 125 that is able to support role swapping and perform host-to-host communications (discussed further below in Section 2). Note that some ports of the port hub 104 do not pass through the bridge 125.

Based on the topological information 120 obtained by the hub configurator 118, the hub configurator 118 can modify a configuration of the port hub 104. The interaction between the hub configurator 118 of the electronic device 102 and the port hub 104 can be through a hub configuration interface 124 that is part of the port hub 104.

1. Hub Configuration

The hub configuration interface 124 can be used for obtaining configuration options (as represented by the topological information 120) of the port hub 104, and for setting the configuration options of the port hub 104. Configuration actions can be performed through the paradigm of getting and setting configuration options associated with topological elements of the port hub 104. Configuration operations can be used to modify the internal topology of the hub, get and set states of the topological elements of the port hub 104, and query metadata (as included in the topological information 120) for topological elements of the port hub 104.

Figure 2:
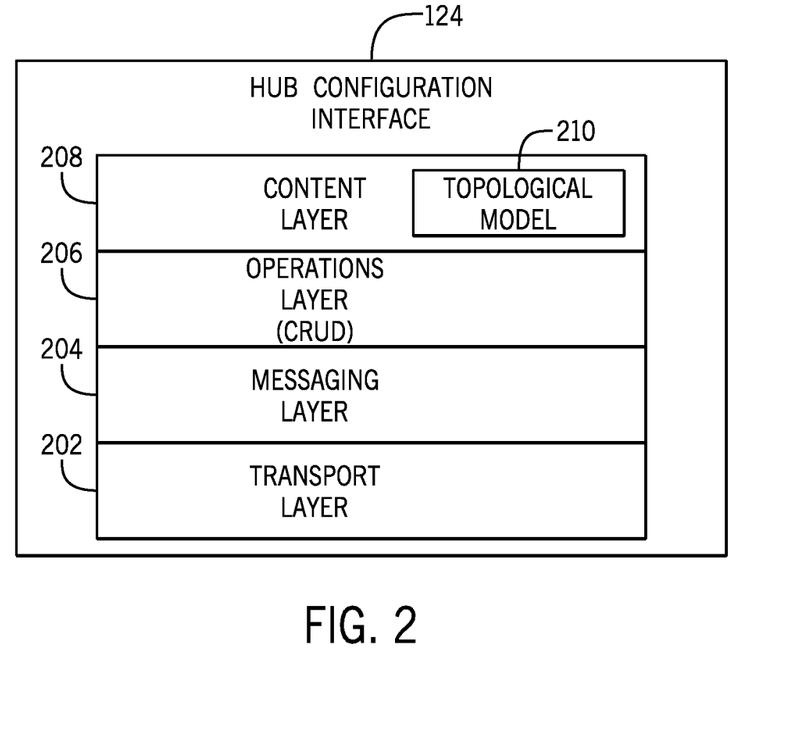
FIG. 2 is a block diagram of a hub configuration interface according to some implementations of the present disclosure.

In some examples, as shown in FIG. 2, the hub configuration interface 124 can include the following layers: a transport layer 202, a messaging layer 204, an operations layer 206, and a content layer 208. In such examples, the transport layer 202 can be considered the lowest layer in the protocol stack of the hub configuration interface 124.

Although specific layers of the hub configuration interface 124 are shown in FIG. 2, it is noted that in other examples, the hub configuration interface 124 can include different layers.

The transport layer 202 of the hub configuration interface 124 transports information in-band using the same USB bus on which the managed port hub 104 is connected. In other words, configuration information, queries, commands, and so forth, relating to the configuration of the port hub 104 can be communicated with USB signaling over the USB bus to which the port hub 104 is connected.

The messaging layer 204 provides a logical channel for sending information to and receiving information from a device (e.g., the electronic device 102). In some examples, to reduce driver support and protocol stack modification, messages exchanged using the messaging layer 204 can be implemented as vendor-specific commands (which can be commands defined by a vendor of the port hub 104 or another device and carried as payload in messages over the USB bus). For example, the vendor-specific commands can be used to implement a remote procedure call (RPC) invoke and RPC response mechanism to perform configuration actions with respect to the port hub 104 using RPC invoke commands and RPC responses.

In alternative examples, asynchronous behavior can be implemented by triggering operations of the hub configuration interface 124 in response to events from notification channel for the port hub 104.

The operations layer 206 provides for CRUD (create, read, update, delete) operations in which topological elements and their attached configurations may be manipulated. The CRUD operations can be initiated by the hub configurator 118 or another entity. A create operation includes creating an instance of an object in the port hub 104, such as an instance of the bridge 125 (discussed further below in Section 2).

The content layer 208 provides for representations of the topological elements of the port hub 104 as well as their associated configurations and metadata. In some examples, representations (in the form of a topological model 210) of the topological elements of the port hub 104 can be according to the YANG model as described in Internet Engineering Task Force (IETF) Request for Comments (RFC) 7950, entitled "The YANG 1.1 Data Modeling Language," dated August 2016. In other examples, representations of the topological elements of the port hub 104 can be in other formats. The representations of the topological elements of the port hub 104 can be stored as part of the topological information 120 (FIG. 1).

The topological model 210 of the topological elements of the port hub 104 provided by the content layer 208 can be in the form of a hierarchy. The hierarchy can include a root, which represents the port hub 104 itself. Other topological elements of the port hub 104 can be represented by other nodes of the topological model 210 that extend from the root. In the topological model 210, each topological element can have any number of configuration objects, where in some examples each configuration object can include a key-value pair. A key-value pair includes a key (which includes an attribute that represents a configuration of a topological element), and a value assigned to the key. In some examples, the configuration objects of a topological element can be in the form of a list of key-value pairs. Configuration objects can be used to store and control metadata and configurations associated with each topological element. Configuration objects can also be used to encode inter-device dependencies, such as dependencies between ports of the port hub 104 (discussed further below).

2. Role Swapping

In accordance with some implementations of the present disclosure, the bridge 125 of the port hub 104 (FIG. 1) supports a role swapping functionality. In FIG. 1, in some scenarios, the electronic device 102 may operate in host mode, and the second device 106 may operate in device mode. A device operating in host mode behaves as a bus master on a USB bus, and can initiate transactions on the USB bus with a device operating in device mode.

However, in other scenarios, the roles of the electronic device 102 and the second device 106 may be swapped, with the second device 106 operating in host mode and the electronic device 102 appearing to operate in device mode. One example of such a scenario is where the electronic device 102 is a head controller of a vehicle, and the second device 106 is a mobile device such as a smartphone, tablet computer, notebook computer, and so forth. A "vehicle" can refer to any or some combination of a truck, a trailer, a tractor, a car, a railed vehicle (e.g., a train), a watercraft (e.g., a ship), an aircraft, a spacecraft, or any other moveable structure that can carry cargo or people.

The head controller of a vehicle can refer to a computer of the vehicle that controls certain vehicle functionalities, such as controlling the display of images on a display device (such as a navigation map, etc.), controlling a sound system of the vehicle, and so forth. The second device 106 may be operated to cast a video on the display device of the vehicle, by leveraging the operation of the head controller. To do so, the second device 106 operates in host mode, and the head controller appears to operate in device mode. Casting a video involves the second device 106 accessing a source of the video, and causing the video to be presented on a different device, such as the display device of the vehicle.

Role swapping can be performed in other scenarios.

To enable role swapping, the bridge 125 can place a downstream USB port (e.g., the port 110 connected to the electronic device 102) in device mode, which effectively makes the downstream USB port appear as a downstream device to both the electronic device 102 and the second device 106. However, both the electronic device 102 and the second device 106 are operated in host mode, such that the electronic device 102 and the second device 106 can perform host-to-host communications through an instance of the bridge 125.

The topological information 120 presented by the port hub 104 can represent a number of ports that reflect the actual physical USB ports 110, 112, 114, and 116 of the port hub 104, internal devices (including the bridge 125) of the port hub 104, and a maximum potential number of instances of the bridge 125. Multiple instances of the bridge 125 can be invoked to handle respective multiple role swap sessions between devices, such as between the electronic device 102 and the second device 106 and/or between other devices.

In examples where the bridge 104 is implemented as machine-readable instructions, invoking an instance of the bridge 125 can refer to starting an instance of the machine-readable instructions of the bridge 125. In other examples where the bridge 104 is implemented as hardware, invoking an instance of the bridge 125 can refer to starting a new session on the bridge 125.

Figure 3:
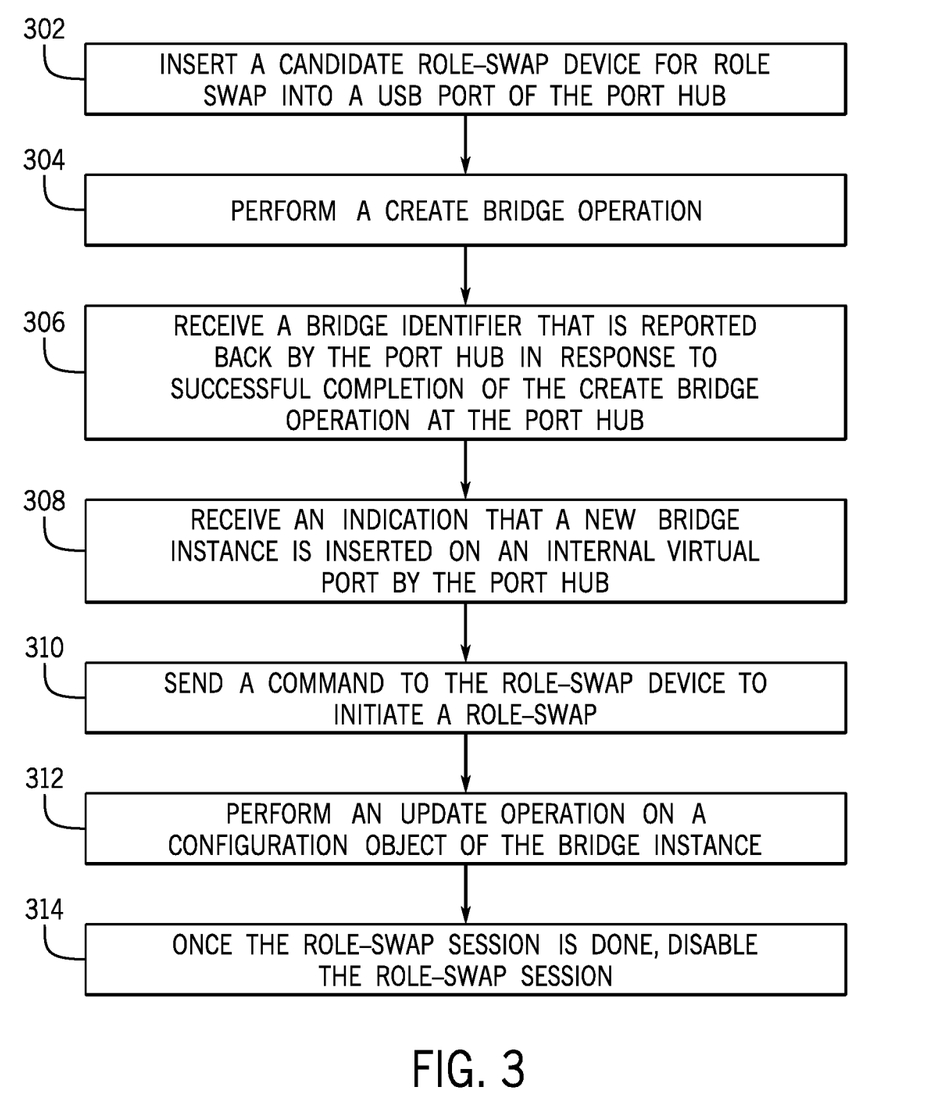
FIG. 3 is a flow diagram of a process according to some implementations of the present disclosure.

FIG. 3 is a flow diagram of a process for performing a role-swap session between devices, such as between the electronic device 102 and the second device 106.

A candidate role-swap device (such as the second device 106) for role swap is inserted (at 302) into a USB port of the port hub 104. The candidate role-swap device is a device whose role is to be swapped from device mode to host mode.

In response to receiving an indication of the insertion of the role-swap device in the port hub 104, the hub configurator 118 of the electronic device 102 performs (at 304) a create bridge operation (using the operations layer 206 of the hub configuration interface 124 as shown in FIG. 2) by setting a CreateBridge configuration object, which allows the hub configurator 118 to specify details about a bridge configuration of an instance of the bridge 125. The create bridge operation invokes a new instance of the bridge 125 (new "bridge instance"). The bridge configuration includes a port to target (e.g., the USB port 110 of the port hub 104 to which the electronic device 102 is connected) as well as device descriptor information to present to the role-swap device. The port to target is the port (e.g., USB port 110) that is to be changed from host mode to device mode for a role-swap session. The device descriptor information includes information of the electronic device 102 to be used by the second device 106, after the role of the port to target has changed to a device mode, and the role of the second device 106 has changed to a host mode.

The hub configurator 118 of the electronic device 102 receives (at 306) a bridge identifier that is reported back by the port hub 104 in response to successful completion of the create bridge operation at the port hub 104, which creates the new bridge instance. A new BridgeSession object representing a role-swap session is created at the port hub 104 as a result of the create operation. The new BridgeSession object defines the role-swap session to be performed using the bridge instance.

The hub configurator 118 of the electronic device 102 receives (at 308) an indication that a new bridge instance is inserted on an internal virtual port by the port hub 104. A reason for deferring creation of a bridge instance in the port hub 104 until a role-swap session is to be created is to avoid inflating the number of devices on a USB bus, and to prevent host side drivers from trying to talk to the bridge instance before the bridge instance is ready. The bridge identifier of the created bridge instance can be in the form of a configuration object, which allows host software (e.g., the hub configurator 118) in the electronic device 102 to reliably identify the created bridge instance.

Once the new bridge instance is ready, the hub configurator 118 sends (at 310) a command to the role-swap device (e.g., the second device 106) to initiate a role swap. Additionally, the hub configurator 118 performs (at 312) an update operation on an ActivateBridge configuration object of the bridge instance. The ActivateBridge configuration object when updated causes the bridge instance to be activated. As a result, the USB port 110 (identified by the bridge configuration as a port to target) is taken over by the bridge instance. Any host-to-host communication (e.g., between the second device 106 and the electronic device 102) will be active over the bridge instance.

Once the role-swap session is done, the hub configurator 118 of the electronic device 102 may disable (at 314) the role-swap session by deleting the BridgeSession object in the port hub 104 or updating the ActivateBridge object in the port hub 104.

Disabling the role-swap session returns the USB port 110 to normal operation, i.e., the USB port 110 is the port connected to the electronic device 110 in host mode.

3. Deterministic Mapping Between Logical and Physical Ports

An issue with existing USB Specifications is that they do not allow for deterministic mapping between logical topological elements (such as representations of port hubs and ports) and physical ports of the port hub 104. For example, in a vehicle with USB ports on a left side of the vehicle, the right side of the vehicle, the front of the vehicle, and the rear of the vehicle, there may be no way for the head controller of the vehicle to reliably target a particular one of the physical USB ports. This can present an issue when a system attempts to selectively set rules for specific physical ports. For example, different display devices can be connected to different physical USB ports of the vehicle. A feature to be implemented in the vehicle may be for a video casting session to cast the video to a specific display device, such as the display device connected to a physical USB port on a left, rear side of the vehicle. As another example, a feature can include access control of specific physical ports, where certain functions are enabled or disabled on a per-physical port basis.

In accordance with some implementations of the present disclosure, configuration objects can be associated with respective (logical) topological elements of the port hub 104.

Figure 4:
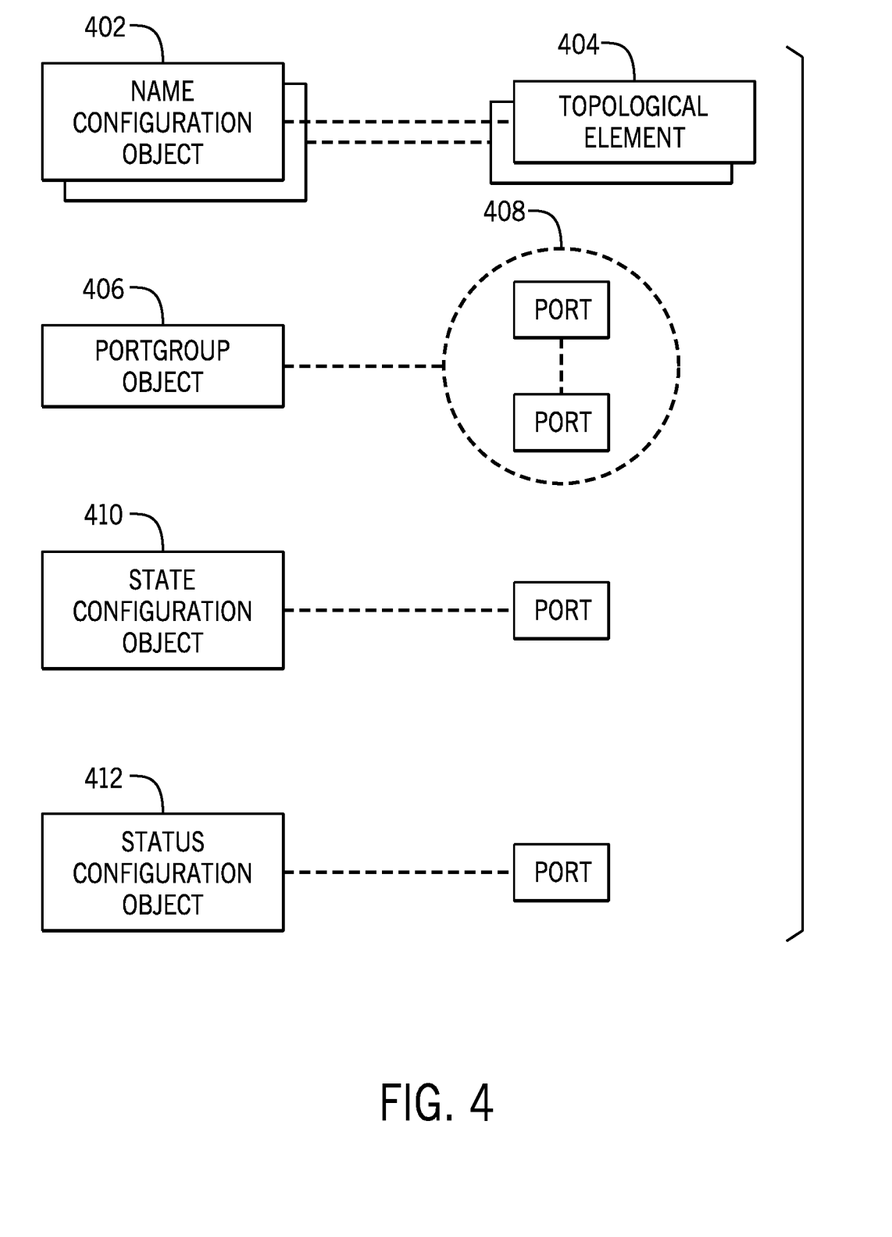
FIG. 4 is a block diagram of example configuration objects according to some implementations of the present disclosure.

As shown in FIG. 4, the configuration objects associated with topological elements 404 of the port hub 104 can include Name configuration objects 402. Each Name configuration object 402 denotes a well-known name of a physical USB port. A "well-known" name refers to a name that is assigned to a device or a physical USB port, and such name is propagated to users or other entities. The name of a device or a physical USB port can be in the form of a number, an alphabet string, an alphanumeric string, or any other identifier. The name can be programmed at the time of manufacture (such as the manufacture of a vehicle or other system) or at a different time. The name can be optionally changeable through update operations. In the context of a vehicle, port hubs can have a name denoting their location in the vehicle, and physical ports can have names denoting their detailed orientation in relation to each other (e.g., "Left Rear Port," "Right Front Port," etc.). The names can then be used to uniquely identify physical ports in a particular system and used to support per-port policy and functionality.

Based on accessing the Name configuration objects 402, the hub configurator 118 is able to map USB identifying properties (properties identifying ports as defined by USB Specifications) of at least a subset of the topological elements of a port hub to respective names of physical ports of the port hub 104.

4. Dependencies Between Ports

Generally, current USB specifications do not provide a way for a port hub to communicate information about dependencies between ports of the port hub. A dependency between ports can refer to a power sharing dependency, for example. A system may restrict the amount of power that can be consumed by the ports, such that if a first port consumes a certain amount of power, then another port (or other ports) may have a limited amount of power available for consumption.

In other examples, other types of dependencies can exist between ports, such as a maximum active port dependency. The maximum active port dependency can specify that a specified number (one or more) of ports can be active at a time. For example, if the port hub 104 has N (N>1) ports, and the maximum number of ports that can be active at a time is M (M≥1), then no more than M port(s) can be active at any given time.

Another example of a dependency includes a functional dependency, where a first port is enabled if a second port is enabled or disabled, but the first port is disabled from operation if the second port is disabled or enabled.

Dependencies between ports can be specified in a configuration object associated with a port hub, such as the port hub 104.

As shown in FIG. 4, a configuration object for the port hub 104 may include a PortGroup object 406 that identifies a group 408 of ports of the port hub that have a port dependency on each other. As noted above, a port dependency can include a power sharing dependency, maximum active port dependency, or a different dependency.

There can be multiple PortGroup objects 406 for different groups of ports with respective port dependencies.

Each PortGroup object 406 includes information that describes the maximum amount of current draw between the ports of the group, and/or the maximum number of ports which can be active at the same time, and so forth.

5. Port State and Status

Current USB specifications do not provide a mechanism by which non-standard states can be reported. A "non-standard" state refers to a state of a port not defined by the current USB Specification. Furthermore, there is no method for reporting on the status of ports in non-standard states. A state of a port can include a disabled state, an enabled state, and so forth. Another example state is a charge-only state (an example of a non-standard state of a port), where a port behaves as a charging port, but data communication to the port is disabled. A data line to a port in the charge-only state is disconnected, but a device can still be connected to the port in the charge-only state.

In accordance with some implementations of the present disclosure, as shown in FIG. 4, a State configuration object 410 is defined for each port of a port hub. The State configuration object 410 specifies a state for a respective port (e.g., enabled, disabled, charge-only, etc.). An entity (such as the hub configurator 118) can read information pertaining to the state of the respective port from the State configuration object 410 to determine more nuanced information about ports, including its state. An entity (such as the hub configurator 118) can update the State configuration object 410 to initiate a port state change. As an example, the State configuration object 410 can be used to control and detect when a port has been put into a charge-only state and made to look like a dedicated charging port.

A port can also be associated with a Status configuration object 412 from which information about a current status of the port can be read, such as by the hub configurator 118. The Status configuration object 412 can include information about whether a port is connected, a status of data activity of the port, a power draw of the port, and/or information of a device connected to the port (e.g., where the information can specify if the connected device is data capable, if the connected device is operating in host mode or device mode, etc.).

The Status configuration object 412 can also specify other properties of a port.

In other examples, instead of using both a State configuration object 410 and Status configuration object 412, a same configuration object can be used to indicate both the state and status of a port.

6. Per Port Security Policy and Functionality

Current USB Specifications do not provide a mechanism to set a security policy and/or function for a USB device, where a specific operation may be enabled or disabled on a per-port basis. This can be due to the lack of an ability to reliability map logical topological elements to physical ports, as explained above in Section 3.

By using the Name configuration objects 402 as discussed in Section 3 and shown in FIG. 4, a deterministic mapping can be performed between logical topological elements and physical ports. By using the Name configuration objects 402, a reliable mechanism is provided by the hub configuration interface 124 to identify different physical ports and to apply different security policies and/or functionalities to different physical ports. For example, a security policy can specify that a rear physical port of a vehicle can be configured for guest access, while a front physical port of the taxi can be configured for full access, such as by the driver of the vehicle. As a further example, a port in the trunk of a vehicle, a port in the back of a vehicle, and a port on the driver's side of the vehicle may be assigned different security policies (to enable different access).

In further examples, by using the Name configuration objects 402 to map topological elements to physical ports, functionalities can be assigned to specific physical ports on a per-port basis, such as assigning a functionality of casting a video on a display device connected to a port in the rear of a vehicle. As another example, a functionality of displaying vehicle controls can be assigned to a port connected to a display device at the front of the vehicle.

7. System Architecture

A processor on which machine-readable instructions are executable can include a microprocessor, a core of a multi-core microprocessor, a microcontroller, a programmable integrated circuit, a programmable gate array, or another hardware processing circuit.

Machine-readable instructions executable on a processor can refer to the instructions executable on a single processor or the instructions executable on multiple processors.

A non-transitory machine-readable or computer-readable storage medium for storing machine-readable instructions can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
a processor; and
a hub configurator executable on the processor to:
obtain, from a port hub that expands a number of ports for the electronic device, information of topological elements of the port hub, wherein the obtained information of the topological elements of the port hub comprises information specifying a dependency among a plurality of ports of the port hub, and wherein the dependency comprises a maximum active port dependency corresponding to a restriction on a number of ports of the plurality of ports that can be active at a time; and
modify a configuration of the port hub.

2. An electronic device comprising:
a processor; and
a hub configurator executable on the processor to:
obtain, from a port hub that expands a number of ports for the electronic device, information of topological elements of the port hub, wherein the obtained information of the topological elements of the port hub comprises information specifying a dependency among a plurality of ports of the port hub, and wherein the information specifying the dependency among the plurality of ports is included in a configuration object representing a group that includes the plurality of ports; and
modify a configuration of the port hub.

3. The electronic device of claim 2, wherein the obtained information of the topological elements of the port hub comprises information specifying a state or status of an individual port of the port hub.

4. The electronic device of claim 3, wherein the information specifying the state of the individual port comprises information of whether the individual port is enabled, disabled, or charge-only.

5. The electronic device of claim 3, wherein the status of the individual port comprises one or more of: a connected status indicating whether or not the individual port is connected to a device, a data activity status indicating a data activity of the individual port, a power draw status indicating a power draw of the individual port, and information of a device connected to the individual port.

6. The electronic device of claim 3, wherein the information specifying the state or status of the individual port is included in a configuration object for the individual port.

7. The electronic device of claim 1, wherein the modifying of the configuration of the port hub comprises updating a configuration object of an individual port of the port hub to change a mode of operation of the individual port.

8. The electronic device of claim 7, wherein the updating of the configuration object comprises changing the mode of operation of the individual port between a charge-only mode and a mode in which data communication can be performed through the individual port.

9. The electronic device of claim 2, wherein the modifying of the configuration of the port hub comprises setting a security policy for an individual port of the port hub.

10. The electronic device of claim 2, wherein the modifying of the configuration of the port hub comprises setting different security policies for respective different ports of the port hub.

11. The electronic device of claim 2, wherein the modifying of the configuration of the port hub comprises setting different functionalities for respective different ports of the port hub.

12. The electronic device of claim 2, wherein the obtained information of the topological elements of the port hub comprises names of ports of the port hub.

13. The electronic device of claim 12, wherein the hub configurator is executable on the processor to map Universal Serial Bus (USB) identifying properties of at least a subset of the topological elements to respective names of the ports of the port hub.

14. A port hub comprising:
a plurality of ports to connect to respective devices; and
a configuration interface to:
provide, to an electronic device connected to a port of the plurality of ports, information of topological elements of the port hub, the information of the topological elements of the port hub comprises information specifying a dependency among the plurality of ports of the port hub, the dependency comprising a maximum active port dependency corresponding to a restriction on a number of ports of the plurality of ports that can be active at a time; and
modify a configuration of the port hub in response to control of the electronic device.

15. A method performed by an electronic device, comprising:
obtaining, from a port hub that expands a number of ports for the electronic device, information of topological elements of the port hub, wherein the obtained information of the topological elements of the port hub comprises information specifying a dependency among a plurality of ports of the port hub, and wherein the dependency comprises a maximum active port dependency corresponding to a restriction on a number of ports of the plurality of ports that can be active at a time; and
modifying a configuration of the port hub.

16. The method of claim 15, wherein the topological elements comprise a bridge, and wherein modifying the configuration of the port hub comprises:

initiating a role swap session with a further device connected to the port hub, and configuring the bridge that comprises configuring a port of the port hub as a downstream port that appears as a device to both the electronic device and the further device that behave as host devices, to enable host-to-host communications between the electronic device and the further device using the bridge.

17. The electronic device of claim 1, wherein the hub configurator is executable on the processor to interact with a configuration interface of the port hub to obtain the information of the topological elements and to modify the configuration of the port hub.

18. The electronic device of claim 1, wherein the topological elements comprise the port hub and the plurality of ports of the port hub.

19. The electronic device of claim 1, wherein the topological elements comprise a bridge through which multiple host devices are to communicate with each other.

20. The electronic device of claim 19, wherein the hub configurator is executable on the processor to:

create a role swap session with a further device connected to the port hub; and configure the bridge.

21. The electronic device of claim 20, wherein the configuring of the bridge comprises configuring a port of the port hub as a downstream port that appears as a device to both the electronic device and the further device that behave as host devices.

22. The electronic device of claim 1, wherein the dependency further comprises a power dependency among the plurality of ports that share power.

* * * * *